(12) United States Patent
Hwang et al.

(10) Patent No.: US 11,118,659 B2
(45) Date of Patent: Sep. 14, 2021

(54) POWER TRANSMISSION APPARATUS OF HYBRID ELECTRIC VEHICLE

(71) Applicants: Hyundai Motor Company, Seoul (KR); Kia Motors Corporation, Seoul (KR)

(72) Inventors: Seong Wook Hwang, Gunpo-Si (KR); Soonki Eo, Ansan-Si (KR); Ilhan Yoo, Hwaseong-Si (KR); Dongwoo Kim, Incheon (KR); Yong Sug Choi, Hwaseong-Si (KR); Jong Hyo Park, Ansan-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 16/883,824

(22) Filed: May 26, 2020

(65) Prior Publication Data

US 2021/0207688 A1 Jul. 8, 2021

(30) Foreign Application Priority Data

Jan. 8, 2020 (KR) .......................... 10-2020-0002680

(51) Int. Cl.
*F16H 3/66* (2006.01)
*B60K 6/26* (2007.10)
*F16H 3/08* (2006.01)

(52) U.S. Cl.
CPC ............... *F16H 3/666* (2013.01); *B60K 6/26* (2013.01); *F16H 2003/0811* (2013.01)

(58) Field of Classification Search
CPC ..... F16H 3/666; F16H 2003/0811; B60K 6/26
See application file for complete search history.

(56) References Cited

U.S. PATENT DOCUMENTS

| 8,801,560 | B2 * | 8/2014 | Van Druten | .............. F16H 3/44 475/207 |
| 8,899,122 | B2 * | 12/2014 | Van Druten | .......... F16H 37/042 74/331 |
| 2008/0064550 | A1 * | 3/2008 | Holmes | .................. B60K 6/365 475/5 |
| 2017/0197613 | A1 * | 7/2017 | Gv | ........................... B60K 6/26 |

\* cited by examiner

*Primary Examiner* — Stacey A Fluhart
(74) *Attorney, Agent, or Firm* — Morgan, Lewis & Bockius LLP

(57) ABSTRACT

A power transmission apparatus for a hybrid electric vehicle may include first and second input shafts coaxially mounted and selectively receiving an engine torque, a compound planetary gear set mounted on the second input shaft, receiving a motor torque, and formed by combining two planetary gear sets sharing a sun gear and a planet carrier, an idle shaft mounted in parallel with the first input shaft, a first output shaft mounted in parallel to the first input shaft, receiving a torque from at least the first input shaft, and outputting a torque through the first output gear, a connection element selectively transmitting the engine torque to the compound planetary gear set or the first input shaft, an engagement element selectively connecting the compound planetary gear set to a transmission housing, and a plurality of gear sets mounted on the first and second input shafts and idle shaft and the first output shaft.

16 Claims, 6 Drawing Sheets

FIG. 2

| Shift-stage | | C1 | B1 | EC | SL1 | | | SL2 | | | SL3 | | |
|---|---|---|---|---|---|---|---|---|---|---|---|---|---|
| | | | | | SG3 | N | SG1 | IS1 | N | RG | N | SG2 |
| Engine mode (parallel hybrid mode) | REV | ● | | ● | | | | ● | | ● | | |
| | FD1 | | ● | ● | | ● | | ● | | | | ● | |
| | FD2 | ● | | ● | | | ● | ● | | | | ● | |
| | FD3 | | ● | ● | ● | | | | ● | | | | ● |
| | FD4 | | ● | ● | ● | ● | | | ● | | | | |
| | FD5 | ● | | ● | | ● | | ● | | | | ● | ● |
| | FD6 | ● | | ● | | | ● | | | ● | | | ● |
| eCVT mode | eCVT1(FD1) | | | ● | | | | ● | | | | ● | |
| | eCVT2(FD2) | | ● | ● | | | ● | ● | | | | ● | |
| | eCVT3(FD3) | | ● | ● | ● | | | ● | | | | ● | |
| EV mode | FD1 | | | | | ● | | ● | | | | ● | |
| | FD2 | ● | | | | ● | | ● | | ● | | | |
| | FD3 | | | | ● | | | ● | | | | ● | |
| | FD4 | | | | ● | | | ● | | | | | ● |
| | FD5 | ● | | | | | ● | ● | | | | | ● |
| | FD6 | ● | | | | | ● | ● | | | | ● | |

● : Operated

FIG. 5

| | | C1 | B1 | EC | SL1 | | | SL2 | | SL3 | | | DG | | |
|---|---|---|---|---|---|---|---|---|---|---|---|---|---|---|---|
| | Shift-stage | | | | SG3 | N | SG1 | IS1 | N | RG | N | SG2 | DG1 | N | DG2 |
| Engine mode (parallel hybrid mode) | REV | ● | | ● | | ● | | ● | | ● | | | ○ | ● | ○ |
| | FD1 | | ● | ● | | ● | | ● | | | ● | | ● | | |
| | FD2 | ● | | ● | | | ● | ● | ● | | | ● | | ○ | ● | ○ |
| | FD3 | | ● | ● | ● | | | ● | ● | | ● | | ● | | |
| | FD4 | | ● | ● | ● | | | ● | ● | | ● | ● | ● | | |
| | FD5 | ● | | ● | | ● | | ● | | | ● | | ○ | ● | ○ |
| | FD6 | ● | | ● | | ● | | ● | | | ● | | ○ | ● | ○ |
| Engine mode (only) | FD7 | | ● | ● | | ● | | ● | | | ● | ● | | | ● |
| | FD8 | | ● | ● | | ● | | ● | | | ● | | | ● | ● |
| | FD9 | | ● | ● | | ● | | ● | | | ● | ● | | ● | ● |
| eCVT mode | eCVT1(FD1) | | | | | | | ● | ● | | ● | | ○ | ● | ○ |
| | eCVT2(FD2) | | | | | | ● | ● | | | ● | ● | ○ | ● | ○ |
| | eCVT3(FD3) | | | | | ● | | ● | ● | | ● | | ○ | ● | ○ |
| EV mode | FD1 | | ● | | | | | ● | | | ● | | ● | | |
| | FD2 | ● | | | | ● | | ● | | | ● | | ○ | ● | ○ |
| | FD3 | | ● | | | ● | | ● | ● | | ● | ● | ● | | |
| | FD4 | | ● | | | | | ● | | | ● | | ● | | |
| | FD5 | ● | | | ● | | | ● | | | ● | ● | ○ | ● | ○ |
| | FD6 | ● | | | ● | | | ● | | | ● | | ○ | ● | ○ |

● : Operated   ○ : Preliminary engagement available

POWER TRANSMISSION APPARATUS OF HYBRID ELECTRIC VEHICLE

CROSS-REFERENCE TO RELATED APPLICATION

The present application claims priority to Korean Patent Application No. 10-2020-0002680 filed on Jan. 8, 2020, the entire contents of which is incorporated herein for all purposes by this reference.

BACKGROUND OF THE INVENTION

Field of the Invention

The present invention relates to a power transmission apparatus of a hybrid electric vehicle.

Description of Related Art

An environment-friendly technology of a vehicle is a core technology which controls survival of a future vehicle industry, and advanced vehicle makers have focused their energy on the development of an environment-friendly vehicle to achieve environmental and fuel efficiency regulations.

Therefore, vehicle makers have developed an electric vehicle (EV), a hybrid electric vehicle (HEV), a fuel cell electric vehicle (FCEV), and the like, as future vehicle technologies.

Since the future vehicle has various technological restrictions such as a weight and cost, the vehicle makers have paid attention to the hybrid electric vehicle as an alternative of a realistic problem for meeting exhaust gas regulations and improving fuel efficiency performance and have entered into keen competition for commercializing the hybrid electric vehicle.

The hybrid electric vehicle is a vehicle using two or more power sources. Two or more power sources may be combined by various schemes and a gasoline engine or a diesel engine using the conventional fossil fuel and a motor-generator driven by electrical energy are mixed and used as the power sources.

In the hybrid electric vehicle, an EV mode in which the hybrid electric vehicle is driven by only the motor, an HEV mode using both the engine and the motor, and an ENG mode using only the engine may be implemented according to the combination of the engine and the motor. Furthermore, the hybrid electric vehicle can provide a significant improvement of fuel efficiency through an idle stop function of stopping the engine when the vehicle stops, and also through a regenerative braking, where a motor-generator is driven as a generator to generate electricity by a kinetic energy of the vehicle under a braking situation, such generated electricity is stored in a battery, and the stored electricity is reused in driving the vehicle.

A transmission for hybrid electric vehicle performs shifting operation based on torques of the engine and the motor-generator. Such a transmission may realize multi-speed, e.g., six speeds, of various modes by additionally employing an engine clutch to be variably connected to the engine to a traditional multi-speed, e.g., six-speed, automatic transmission.

Such a transmission for a hybrid electric vehicle may typically include three planetary gear sets, six operational elements, and at least one one-way clutch OWC, similarly to a conventional six-speed automatic transmission, as well as the additional engine clutch. By such a scheme, the transmission for a hybrid electric vehicle may not be understood to be best optimized for a hybrid electric vehicle, and may be improved to provide better efficiency, better performance, and better fuel consumption, or less production cost.

The information included in the present Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a power transmission apparatus of a hybrid electric vehicle having advantages of, by applying a compound planetary gear set to simplify the structure of a transmission, realizing various shifting modes, such as an engine mode and a parallel hybrid mode respectively having a plurality of speeds, an electronically-controlled continuously variable shifting mode (eCVT mode), and an electric vehicle mode (EV mode), reducing a production cost, and realizing fuel consumption characteristic and power performance above an equivalent transmission.

An exemplary power transmission apparatus is for a hybrid electric vehicle having power sources of an engine and a motor-generator, and includes a first input shaft mounted along an axis of an engine output shaft and selectively connectable to the engine output shaft, a second input shaft formed as a hollow shaft, coaxially mounted with the first input shaft without rotational interference with the first input shaft, and selectively connectable to the first input shaft, a compound planetary gear set mounted along an axis of the second input shaft and formed as a combination of first and second planetary gear sets sharing a sun gear and a planet carrier between the first and second planetary gear sets to form first, second, third, and fourth rotation elements, the first rotation element being selectively connectable to a transmission housing, the second rotation element being fixedly connected to the second input shaft, the third rotation element being fixedly connected to a rotor of the motor-generator, and the fourth rotation element being fixedly connected to the engine output shaft, an idle shaft mounted in parallel with the first input shaft, a first output shaft mounted in parallel to the first input shaft, receiving a torque from at least the first input shaft, and outputting a torque through the first output gear, at least one connection element selectively transmitting a torque received from the engine output shaft to a rotation element among the first rotation element, the second rotation element, the third rotation element, and the fourth rotation element of the compound planetary gear set or the first input shaft or the first input shaft, at least one engagement element selectively connecting at least one rotation element among the first rotation element, the second rotation element, the third rotation element, and the fourth rotation element of the compound planetary gear set to the transmission housing, and a plurality of gear sets mounted on the first and second input shafts, the idle shaft and the first output shaft to form an external a predetermined gear engagement.

The first planetary gear set may be formed as a single pinion planetary gear set, and includes a first sun gear as the first rotation element, a common planet carrier as the second rotation element for rotatably supporting a shared planetary gear, and a first ring gear as the third rotation element. The second planetary gear set may be formed as a single planetary gear set, shares the first sun gear and the common planet carrier with the first planetary gear set, and includes a second ring gear as the fourth rotation element.

The shared planetary gear may include a small diameter portion mounted toward the first planetary gear set and a large diameter portion mounted toward the second planetary gear set.

The at least one connection element may include an engine clutch selectively connecting the engine output shaft and the fourth rotation element, and a first clutch selectively connecting the fourth rotation element and the first input shaft.

The at least one engagement element may include a first brake mounted between the transmission housing and the first rotation element of the compound planetary gear set.

The plurality of gear sets may include a first gear set including a second input gear fixedly mounted on the first input shaft, and a third shifting gear rotatably mounted on the first output shaft, externally gear-meshed with the second input gear, and selectively connectable to the first output shaft, a second gear set including a first input gear fixedly mounted on the first input shaft, a first idle gear fixedly mounted on the idle shaft and externally gear-meshed with the first input gear, and a first shifting gear rotatably mounted on the first output shaft, externally gear-meshed with the first input gear, and selectively connectable to the first output shaft, a third gear set including a second idle gear fixedly mounted on the idle shaft, and a reverse shifting gear rotatably mounted on the first output shaft, externally gear-meshed with the second idle gear, and selectively connectable to the first output shaft, and a fourth gear set including a third input gear fixedly mounted on the second input shaft, and a second shifting gear rotatably mounted on the first output shaft, externally gear-meshed with the third input gear, and selectively connectable to the first output shaft.

The first and third shifting gears may be selectively connectable to the first output shaft by a first synchronizer. The second input shaft may be selectively connectable to the first input shaft by a second synchronizer. The second shifting gear and the reverse shifting gear may be respectively selectively connectable to the first output shaft by a third synchronizer.

The exemplary power transmission apparatus may further include a second output shaft mounted in parallel to the first input shaft, receiving torques from the second input shaft and the idle shaft, and outputting a torque through the second output gear.

The plurality of gear sets may include a first gear set including a second input gear fixedly mounted on the first input shaft, and a third shifting gear rotatably mounted on the first output shaft, externally gear-meshed with the second input gear, and selectively connectable to the first output shaft, a second gear set including a first input gear fixedly mounted on the first input shaft, a first idle gear fixedly mounted on the idle shaft and externally gear-meshed with the first input gear, a first shifting gear rotatably mounted on the first output shaft, externally gear-meshed with the first input gear, and selectively connectable to the output shaft, and a reverse shifting gear rotatably mounted on the second output shaft, externally gear-meshed with the first idle gear, and selectively connectable to the second output shaft, and a third gear set including a third input gear fixedly mounted on the second input shaft, and a second shifting gear rotatably mounted on the second output shaft, externally gear-meshed with the third input gear, and selectively connectable to the second output shaft.

The first and third shifting gears may be selectively connectable to the first output shaft by a first synchronizer. The second input shaft may be selectively connectable to the first input shaft by a second synchronizer. The second shifting gear and the reverse shifting gear may be selectively connectable to the second output shaft by a third synchronizer.

The at least one engagement element may include a first brake formed at the transmission housing, and a bi-directional dog clutch mounted between the first brake and the first and third rotation elements of the compound planetary gear set to selectively connect the first brake to one of the first and third rotation elements.

The bi-directional dog clutch may include a first gear connected to the first rotation element of the compound planetary gear set through a first connecting member, a second gear connected to the third rotation element of the compound planetary gear set through a second connecting member, and a clutch gear connected to the first brake and selectively teeth-engaged with one of the first and second gears to selectively connect the first brake to the first rotation element or the third rotation element.

According to a power transmission apparatus of a hybrid electric vehicle according to an exemplary embodiment of the present invention, while simplifying the structure of a transmission by employing only one compound planetary gear set, various shifting modes, such as an engine mode and a parallel hybrid mode respectively having nine speeds, an electronically-controlled continuously variable shifting mode (eCVT mode) having three shifting stages, and an electric vehicle mode (EV mode) having six shift-speeds, may be realized, reducing a production cost and realizing fuel consumption characteristic and power performance above an equivalent transmission.

Furthermore, the number of employed planetary gear sets may be decreased in comparison to a conventional six-speed transmission, and therefore, an overall length may be decreased, improving installability into a vehicle.

Furthermore, by applying a bi-directional dog clutch, the number of unengaged wet-type clutches is decreased to improve power delivery efficiency, and simultaneously, fuel consumption may be improved by use of the eCVT mode when driving in a city-mode.

Furthermore, by controlling a brake through a bi-directional dog clutch, a drag loss of the brake may be prevented by utilizing a neutral state of the bi-directional dog clutch.

Furthermore, effects which may be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of a power transmission apparatus of a hybrid electric vehicle according to various exemplary embodiments.

FIG. 5 is an operation chart of a power transmission apparatus of a hybrid electric vehicle according to various exemplary embodiments.

Figure 1:
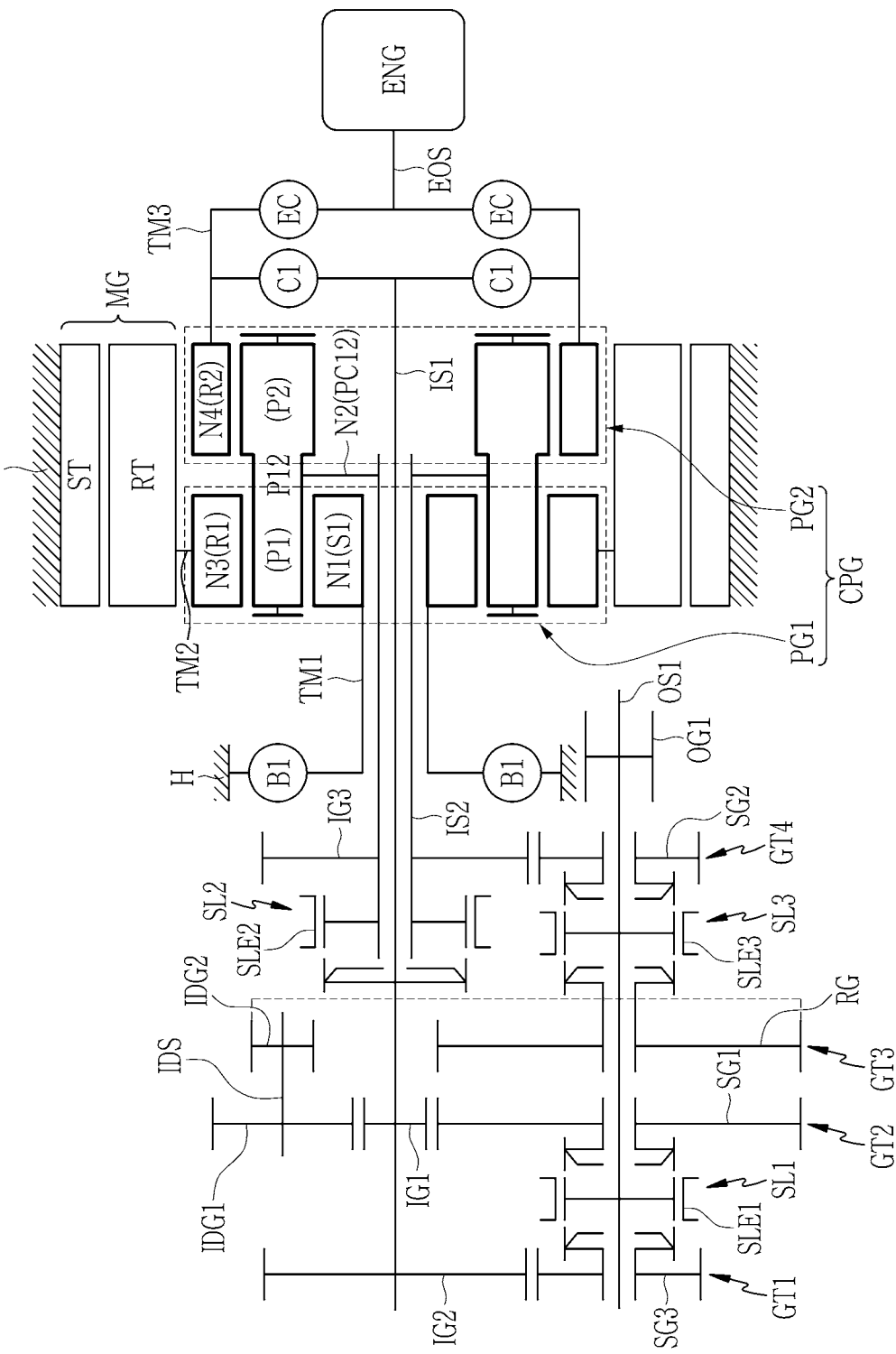
FIG. 1 is a schematic diagram of a power transmission apparatus of a hybrid electric vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

FIG. 1 is a schematic diagram of a power transmission apparatus of a hybrid electric vehicle according to various exemplary embodiments of the present invention.

Referring to FIG. 1, a power transmission apparatus of a hybrid electric vehicle according to various exemplary embodiments receives torques from power sources of an engine ENG and a motor-generator MG and includes first and second input shafts IS1 and IS2, a compound planetary gear set CPG for shifting torques received from the engine ENG and the motor-generator MG and outputting a shifted torque to the second input shaft IS2, an idle shaft IDS, a first output shaft OS1, at least one connection element, at least one engagement element, and a plurality of gear sets GT1 to GT4.

The engine ENG is a primary power source, and may be implemented as one of various types such as a gasoline engine or a diesel engine.

The motor-generator MG is fixedly connected to the compound planetary gear set CPG and is used as an auxiliary power source.

The motor-generator MG may act as a motor and also as a generator, and includes a stator ST and a rotor RT, where the stator ST is fixed to a transmission housing H, and the rotor RT is internally mounted within the stator ST and rotatable relative to the stator ST.

That is, the torques of the engine ENG and the motor-generator MG are respectively transmitted to the first input shaft IS1 and the second input shaft IS2, shifted to a plurality of shifting stages while being transmitted to the first output shaft OS1 through first gear set GT1 to fourth gear set GT4, and is output through the first output gear OG1.

The first input shaft IS1 is mounted along an axis of the engine output shaft EOS and selectively connectable to the engine output shaft EOS, and selectively receives the torque of the engine ENG.

The second input shaft IS2 is formed as a hollow shaft coaxial with the first input shaft IS1 without a rotational interference, and selectively connectable to the first input shaft IS1.

The compound planetary gear set CPG is coaxially mounted on the second input shaft IS2, and is formed in a Ravingneaux type sharing a sun gear and a planet carrier by a combination of first and second planetary gear sets PG1 and PG2.

In more detail, the first planetary gear set PG1 is formed as a single pinion planetary gear set, and includes a first rotation element N1 of a first sun gear S1, a second rotation element N2 of a common planet carrier PC12 rotatably supporting a shared planetary gear P12, and a third rotation element N3 of a first ring gear R1. Furthermore, the second planetary gear set PG2 is formed as a single planetary gear set, shares the first rotation element N1 (the first sun gear S1) and the second rotation element N2 (the common planet carrier PC12) with the first planetary gear set PG1, and includes a fourth rotation element N4 of a second ring gear R4. Thus, the compound planetary gear set CPG forms four rotation elements N1, N2, N3, and N4.

As the shared planetary gear P12, a small diameter portion P1 mounted toward the first planetary gear set PG1 and a large diameter portion P2 mounted toward the second planetary gear set PG2 are integrally formed.

In such a compound planetary gear set CPG, the first rotation element N1 is selectively connectable to the transmission housing H through first connecting member TM1, the second rotation element N2 is fixedly connected to the second input shaft IS2, the third rotation element N3 is fixedly connected to the rotor RT of the motor-generator MG through the second connecting member TM2, and the fourth rotation element N4 is fixedly connected to the engine output shaft EOS through third connecting member TM3.

In an exemplary embodiment of the present invention, when two or more members are described to be "fixedly connected", where each of the members may be any of a connecting member, an input shaft, an output shaft, a rotation member, and a transmission housing, it means that the fixedly connected members always rotate at a same speed.

When two or more members are described to be "selectively connectable" by an engagement element, it means that the selectively connectable members rotate separately when the engagement element is not engaged, and rotates at a same speed when the engagement element is engaged.

It may be understood that in the case that a member is "selectively connectable" to a transmission housing by an engagement element, the member may be stationary when the engagement element is engaged.

The motor-generator MG is mounted external to the compound planetary gear set CPG and internal to the transmission housing H.

The idle shaft IDS is mounted in parallel with the first input shaft IS1, and connected to the first input shaft IS1 and the first output shaft OS1 through external a predetermined gear engagements, transmitting a torque from the first input shaft IS1 to the first output shaft OS1 by a preset reduction ratio.

The first output shaft OS1 is mounted in parallel with the first input shaft IS1, receives torques from the first and second input shafts IS1 and IS2 and the idle shaft IDS, and outputs a torque through the first output gear OG1.

The first and second input shafts IS1 and IS2 are mounted on a same axis, and the idle shaft IDS and the first output shaft OS1 are mounted in parallel with the first input shaft IS1.

The at least one connection element includes an engine clutch EC and a first clutch C1.

The engine clutch EC is mounted between the engine output shaft EOS and the fourth rotation element N4 of the compound planetary gear set CPG to selectively connect the engine output shaft EOS and the fourth rotation element N4, selectively transmitting the torque of the engine ENG to the compound planetary gear set CPG.

The first clutch C1 is mounted between the first input shaft IS1 and the fourth rotation element N4 of the compound planetary gear set CPG, and selectively connects fourth rotation element N4 and the first input shaft IS1 to selectively transmit the torque of the engine ENG to first input shaft IS1 under the operation of the engine clutch EC.

The at least one engagement element includes a first brake B1.

The first brake B1 is mounted between the transmission housing H and the first connecting member TM1 connected to the first rotation element N1 (first sun gear S1) of the compound planetary gear set CPG, and therefore, the first rotation element N1 may selectively act as a fixed element.

The engagement elements of the engine clutch CL, the first clutch C1, and the first brake B1 may be realized as multi-plate hydraulic pressure friction devices that are frictionally engaged by hydraulic pressure, however, it may not be understood to be limited thereto, since various other configuration that are electrically controllable may be available.

The plurality of gear sets includes first to fourth gear sets GT1 to GT4 that are mounted over and form an external gear engagement among the first and second input shafts IS1 and IS2, idle shaft IDS, and the first output shaft OS1 with respective gear ratios.

The first gear set GT1 includes a second input gear IG2 fixedly mounted on the first input shaft IS1, and a third shifting gear SG3 mounted on the first output shaft OS1 without rotational interference therebetween, externally gear-meshed with the second input gear IG2, and selectively connectable to the first output shaft OS1.

The second gear set GT2 includes a first input gear IG1 fixedly mounted on the first input shaft IS1, a first idle gear IDG1 fixedly mounted on the idle shaft IDS and externally gear-meshed with the first input gear IG1, and a first shifting gear SG1 mounted on the first output shaft OS1 without rotational interference therebetween, externally gear-meshed with the first input gear IG1, and selectively connectable to the first output shaft OS1.

The third gear set GT3 includes a second idle gear IDG2 fixedly mounted on the idle shaft IDS, and a reverse shifting gear RG mounted on the first output shaft OS1 without rotational interference therebetween, externally gear-meshed with the second idle gear IDG2, and selectively connectable to the first output shaft OS1.

The fourth gear set GT4 includes a third input gear IG3 fixedly mounted on the second input shaft IS2, and a second shifting gear SG2 mounted on the first output shaft OS1 without rotational interference therebetween, externally gear-meshed with the third input gear IG3, and selectively connectable to the first output shaft OS1.

Gear ratios of drive and driven gears of the first, second, third and fourth gear sets GT1, GT2, GT3, and GT4 may be appropriately set according to desired feature of the transmission.

In the arrangement of the four gear sets GT1 to GT4, synchronizers may be employed for selective connections, and in the various exemplary embodiments of the present invention, three synchronizers SL1, SL2, and SL3 are employed.

That is, the first synchronizer SL1 is mounted between first and third shifting gears SG1 and SG3 and the first output shaft OS1, and selectively connects the first shifting gear SG1 or the third shifting gear SG3 to the first output shaft OS1.

The second synchronizer SL2 is mounted between the second input shaft IS2 and the first input shaft IS1, and selectively connects the second input shaft IS2 to the first input shaft IS1.

Furthermore, the third synchronizer SL3 is mounted between the second shifting gear SG2 and reverse shifting gear RG, and the first output shaft OS1, and selectively connects the second shifting gear SG2 or the reverse shifting gear RG to the first output shaft OS1

The first, second, and third synchronizers SL1, SL2, and SL3 may be formed as a known scheme, and first, second, third sleeve SLE1, SLE2, and SLE3 applied to the first, second, and third synchronizers SL1, SL2, and SL3 may be operated by actuators which may be controlled by a transmission control unit.

FIG. 2 is an operation chart of a power transmission apparatus of a hybrid electric vehicle according to various exemplary embodiments of the present invention of the FIG. 1, and the power transmission apparatus according to various exemplary embodiments may provide an engine mode and a parallel hybrid mode respectively having seven fixed shifting stages including a reverse speed REV, an electric vehicle mode (EV mode) having six shifting stages, and an eCVT mode having three shifting stages, which is hereinafter described in detail.

[engine mode reverse speed (parallel hybrid mode reverse speed)]

In an engine mode reverse speed REV, as shown in shown in FIG. 2, the second sleeve SLE2 of the second synchronizer SL2 is operated to synchronously connect the first and second input shafts IS1 and IS2, the third sleeve SLE3 of the third synchronizer SL3 is operated to synchronously connect the reverse shifting gear RG to the first output shaft OS1, and the engine clutch EC and the first clutch C1 are operated.

As a result, the compound planetary gear set CPG integrally rotates by the operation of the first clutch C1 and the second synchronizer SL2, and by the operation of the engine clutch EC, the first clutch C1, and the third synchronizer SL3, the torque of the engine ENG passes through the through the engine output shaft EOS, the first input shaft IS1, the second gear set GT2, the idle shaft IDS, the third gear set GT3, and the first output shaft OS1.

The torque received through the first output shaft OS1 is delivered to the differential through the first output gear OG1, realizing the reverse speed.

At the present time, it may be understood that a parallel hybrid mode is also available when the motor-generator MG is operated, since the torque of the motor-generator MG is input to the third rotation element N3 of the compound planetary gear set CPG, and transmitted through the second input shaft IS2, the first input shaft IS1, the second gear set GT2, the idle shaft IDS, the third gear set GT3, and the first output shaft OS1.

[Engine Mode First Forward Speed (Parallel Hybrid Mode First Forward Speed)]

In an engine mode first forward speed FD1, as shown in FIG. 2, the first sleeve SLE1 of the first synchronizer SL1 is operated to synchronously connect the first shifting gear SG1 to the first output shaft OS1, the second sleeve SLE2 of the second synchronizer SL2 is operated to synchronously connect the first and second input shafts IS1 and IS2, and the engine clutch EC and the first brake B1 are operated.

As a result, by the operation of the first brake B1 and the first and second synchronizers SL1 and SL2, the first rotation element N1 of the compound planetary gear set CPG acts as a fixed element, and the torque of the engine ENG is input from the engine output shaft EOS to the fourth rotation element N4 of the compound planetary gear set CPG by the operation of the engine clutch EC, reduced in rotation speed at the second rotation element N2, and transmitted to the second input shaft IS2, the first input shaft IS1, the second gear set GT2, and the first output shaft OS1.

The torque received through the first output shaft OS1 is delivered to the differential through the first output gear OG1, realizing the first forward speed.

At the present time, it may be understood that a parallel hybrid mode is also available when the motor-generator MG is operated, since the torque of the motor-generator MG is input to the third rotation element N3 of the compound planetary gear set CPG, and transmitted through the second input shaft IS2, the first input shaft IS1, the second gear set GT2, and the first output shaft OS1.

[Engine Mode Second Forward Speed (Parallel Hybrid Mode Second Forward Speed)]

In an engine mode second forward speed FD2, as shown in FIG. 2, the first sleeve SLE1 of the first synchronizer SL1 is operated to synchronously connect the first shifting gear SG1 to the first output shaft OS1, and the engine clutch EC and the first clutch C1 are operated.

As a result, by the operation of the engine clutch EC, the first clutch C1, and the first synchronizer SL1, the torque of the engine ENG is transmitted from the engine output shaft EOS to the first input shaft IS1, the second gear set GT2, and the first output shaft OS1.

The torque received through the first output shaft OS1 is delivered to the differential through the first output gear OG1, realizing the second forward speed.

At the present time, it may be understood that a parallel hybrid mode is also available when the motor-generator MG is operated, since the torque of the motor-generator MG is input to the third rotation element N3 of the compound planetary gear set CPG, and transmitted through the fourth rotation element N4 of the shared planetary gear P12, the first input shaft IS1, the second gear set GT2, and the first output shaft OS1.

[Engine Mode Third Forward Speed (Parallel Hybrid Mode Third Forward Speed)]

In an engine mode third forward speed FD3, as shown in FIG. 2, the third sleeve SLE3 of the third synchronizer SL3 is operated to synchronously connect the second shifting gear SG2 to the first output shaft OS1, and the engine clutch EC and the first brake B1 are operated.

As a result, by the operation of the first brake B1 and the third synchronizer SL3, the first rotation element N1 of the compound planetary gear set CPG acts as a fixed element, and the torque of the engine ENG is input from the engine output shaft EOS to the fourth rotation element N4 of the compound planetary gear set CPG by the operation of the engine clutch EC, reduced in a rotation speed at the second rotation element N2, and transmitted to the second input shaft IS2, the fourth gear set GT4, and the first output shaft OS1.

The torque received through the first output shaft OS1 is delivered to the differential through the first output gear OG1, realizing the third forward speed.

At the present time, it may be understood that a parallel hybrid mode is also available when the motor-generator MG is operated, since the torque of the motor-generator MG is input to the third rotation element N3 of the compound planetary gear set CPG, and transmitted through the second input shaft IS2, the fourth gear set GT4, and the first output shaft OS1.

[Engine Mode Fourth Forward Speed (Parallel Hybrid Mode Fourth Forward Speed)]

In an engine mode fourth forward speed FD4, as shown in FIG. 2, the first sleeve SLE1 of the first synchronizer SL1 is operated to synchronously connect the third shifting gear SG3 to the first output shaft OS1, the second sleeve SLE2 of the second synchronizer SL2 is operated to synchronously connect the first and second input shafts IS1 and IS2, and the engine clutch EC and the first brake B1 are operated.

As a result, by the operation of the first brake B1 and the first and second synchronizers SL1 and SL2, the first rotation element N1 of the compound planetary gear set CPG acts as a fixed element, and the torque of the engine ENG is input from the engine output shaft EOS to the fourth rotation element N4 of the compound planetary gear set CPG by the operation of the engine clutch EC, reduced in rotation speed at the second rotation element N2, and transmitted to the second input shaft IS2, the first input shaft IS1, the first gear set GT1, and the first output shaft OS1.

The torque transmitted to the first output shaft OS1 is delivered to the differential through the first output gear OG1, realizing the fourth forward speed.

At the present time, it may be understood that a parallel hybrid mode is also available when the motor-generator MG is operated, since the torque of the motor-generator MG is input to the third rotation element N3 of the compound planetary gear set CPG, and transmitted through the second input shaft IS2, the first input shaft IS1, the first gear set GT1, and the first output shaft OS1.

[Engine Mode Fifth Forward Speed (Parallel Hybrid Mode Fifth Forward Speed)]

In an engine mode fifth forward speed FD5, as shown in FIG. 2, the second sleeve SLE2 of the second synchronizer SL2 is operated to synchronously connect the first and second input shafts IS1 and IS2, the third sleeve SLE3 of the third synchronizer SL3 is operated to synchronously connect the second shifting gear SG2 to the first output shaft OS1, and the engine clutch EC and the first clutch C1 are operated.

As a result, by the operation of the engine clutch EC, the first clutch C1, and the second and third synchronizers SL2 and SL3, the torque of the engine ENG is transmitted from the engine output shaft EOS to the first input shaft IS1, the second input shaft IS2, and the fourth gear set GT4, first output shaft OS1.

The torque received through the first output shaft OS1 is delivered to the differential through the first output gear OG1, realizing the fifth forward speed.

At the present time, it may be understood that a parallel hybrid mode is also available when the motor-generator MG is operated, since the torque of the motor-generator MG is input to the third rotation element N3 of the compound planetary gear set CPG, and transmitted through the fourth rotation element N4 of the shared planetary gear P12, the first input shaft IS1, the second input shaft IS2, and the fourth gear set GT4, first output shaft OS1.

[Engine Mode Sixth Forward Speed (Parallel Hybrid Mode Sixth Forward Speed)]

In an engine mode sixth forward speed FD6, as shown in FIG. 2, the first sleeve SLE1 of the first synchronizer SL1 is operated to synchronously connect the third shifting gear SG3 to the first output shaft OS1, and the engine clutch EC and the first clutch C1 are operated.

As a result, by the operation of the engine clutch EC, the first clutch C1, and the first synchronizer SL1, the torque of the engine ENG is transmitted from the engine output shaft EOS to the first input shaft IS1, the first gear set GT1, and the first output shaft OS1.

The torque received through the first output shaft OS1 is delivered to the differential through the first output gear OG1, realizing the sixth forward speed.

At the present time, it may be understood that a parallel hybrid mode is also available when the motor-generator MG is operated, since the torque of the motor-generator MG is input to the third rotation element N3 of the compound planetary gear set CPG, and transmitted through the fourth rotation element N4 of the shared planetary gear P12, the first input shaft IS1, the first gear set GT1, and the first output shaft OS1.

The electric vehicle mode (EV mode) realizes six shifting stages of EV mode first forward speed FD1 to EV mode sixth forward speed FD6, and in such an EV mode, the engine ENG is stopped, the engine clutch EC is released, and the motor-generator MG is operated to output a torque.

[EV Mode First Forward Speed]

In an EV mode first forward speed FD1, as shown in FIG. 2, the first sleeve SLE1 of the first synchronizer SL1 is operated to synchronously connect the first shifting gear SG1 to the first output shaft OS1, the second sleeve SLE2 of the second synchronizer SL2 is operated to synchronously connect the first and second input shafts IS1 and IS2, and the first brake B1 is operated.

As a result, by the operation of the first brake B1 and the first and second synchronizers SL1 and SL2, the first rotation element N1 of the compound planetary gear set CPG acts as a fixed element, and the torque of the motor-generator MG is input to the third rotation element N3 of the compound planetary gear set CPG, and transmitted through the second rotation element N2, the second input shaft IS2, the first input shaft IS1, the second gear set GT2, and the first output shaft OS1.

The torque received through the first output shaft OS1 is delivered to the differential through the first output gear OG1, realizing the first forward speed.

[EV Mode Second Forward Speed]

In an EV mode second forward speed FD2, as shown in FIG. 2, as shown in FIG. 2, the first sleeve SLE1 of the first synchronizer SL1 is operated to synchronously connect the first shifting gear SG1 to the first output shaft OS1, the second sleeve SLE2 of the second synchronizer SL2 is operated to synchronously connect the first and second input shafts IS1 and IS2, and the first clutch C1 is operated.

As a result, by the operation of the first clutch C1 and the first and second synchronizers SL1 and SL2, the second and fourth rotation elements N2 and N4 of the compound planetary gear set CPG are connected to rotate at a same rotation speed, and the torque of the motor-generator MG is input to the third rotation element N3 of the compound planetary gear set CPG by the operation of the first synchronizer SL1, and transmitted through the second rotation element N2, the second input shaft IS2, the first input shaft IS1, the second gear set GT2, and the first output shaft OS1.

The torque received through the first output shaft OS1 is delivered to the differential through the first output gear OG1, realizing the second forward speed.

[EV Mode Third Forward Speed]

In an EV mode third forward speed FD3, as shown in FIG. 2, as shown in FIG. 2, the third sleeve SLE3 of the third synchronizer SL3 is operated to synchronously connect the second shifting gear SG2 to the first output shaft OS1, and the first brake B1 is operated.

As a result, by the operation of the first brake B1 and the third synchronizer SL3, the first rotation element N1 of the compound planetary gear set CPG acts as a fixed element, and the torque of the motor-generator MG is input to the third rotation element N3 of the compound planetary gear set CPG, and transmitted through the second input shaft IS2, the fourth gear set GT4, and the first output shaft OS1+.

The torque received through the first output shaft OS1 is delivered to the differential through the first output gear OG1, realizing the third forward speed.

[EV Mode Fourth Forward Speed]

In an EV mode fourth forward speed FD4, as shown in FIG. 2, as shown in FIG. 2, the first sleeve SLE1 of the first synchronizer SL1 is operated to synchronously connect the third shifting gear SG3 to the first output shaft OS1, the second sleeve SLE2 of the second synchronizer SL2 is operated to synchronously connect the first and second input shafts IS1 and IS2, and the first brake B1 is operated.

As a result, by the operation of the first brake B1 and the first and second synchronizers SL1 and SL2, the first rotation element N1 of the compound planetary gear set CPG acts as a fixed element, and the torque of the motor-generator MG is input to the third rotation element N3 of the compound planetary gear set CPG, and transmitted through the second input shaft IS2, the first input shaft IS1, the first gear set GT1, and the first output shaft OS1.

The torque transmitted to the first output shaft OS1 is delivered to the differential through the first output gear OG1, realizing the fourth forward speed.

[EV Mode Fifth Forward Speed]

In an EV mode fifth forward speed FD5, as shown in FIG. 2, as shown in FIG. 2, the second sleeve SLE2 of the second synchronizer SL2 is operated to synchronously connect the first and second input shafts IS1 and IS2, the third sleeve SLE3 of the third synchronizer SL3 is operated to synchronously connect the second shifting gear SG2 to the first output shaft OS1, and the first clutch C1 is operated.

As a result, by the operation of the first clutch C1 and the second synchronizer SL2, the second and fourth rotation elements N2 and N4 of the compound planetary gear set CPG are connected to rotate at a same rotation speed. By the operation of the third synchronizer SL3, the torque of the motor-generator MG is input to the third rotation element N3 of the compound planetary gear set CPG, and transmitted through the second rotation element N2, the second input shaft IS2, the fourth gear set GT4, and the first output shaft OS1.

The torque received through the first output shaft OS1 is delivered to the differential through the first output gear OG1, realizing the fifth forward speed.

[EV Mode Sixth Forward Speed]

In an EV mode sixth forward speed FD6, as shown in FIG. 2, as shown in FIG. 2, the first sleeve SLE1 of the first synchronizer SL1 is operated to synchronously connect the third shifting gear SG3 to the first output shaft OS1, the second sleeve SLE2 of the second synchronizer SL2 is operated to synchronously connect the first and second input shafts IS1 and IS2, and the first clutch C1 is operated.

As a result, by the operation of the first clutch C1 and the first and second synchronizers SL1 and SL2, the second and fourth rotation elements N2 and N4 of the compound planetary gear set CPG are connected to rotate at a same rotation speed, and the torque of the motor-generator MG is input to the third rotation element N3 of the compound planetary gear set CPG by the operation of the first synchronizer SL1, and transmitted through the second rotation element N2, the second input shaft IS2, the first input shaft IS1, the first gear set GT1, and the first output shaft OS1.

The torque received through the first output shaft OS1 is delivered to the differential through the first output gear OG1, realizing the sixth forward speed.

The eCVT mode realizes three shifting stages of an eCVT1 mode (FD1) to an eCVT3 mode (FD3). In such an eCVT mode, the engine clutch EC is operated, the engine ENG is operated at a fixed rotation speed, and a rotation speed of the motor-generator MG is controlled to realize a shifting operation.

[eCVT1 Mode]

In the eCVT1 mode, the engine ENG is operated at a fixed rotation speed. In the instant state, as shown in FIG. 2, the first sleeve SLE1 of the first synchronizer SL1 is operated to synchronously connect the first shifting gear SG1 to the first output shaft OS1, the second sleeve SLE2 of the second synchronizer SL2 is operated to synchronously connect the first and second input shafts IS1 and IS2, and the engine clutch EC is operated.

In the instant case, the torque of the engine ENG rotating at a fixed rotation speed is input to the fourth rotation element N4 of the compound planetary gear set CPG, and the torque of the motor-generator MG is input to the third rotation element N3 of the compound planetary gear set CPG.

In such a state, when the rotation speed of the motor-generator MG is varied, the torque of the motor-generator MG is input to the second rotation element N2 of the compound planetary gear set CPG, and by the operation of the first and second synchronizers SL1 and SL2, transmitted through the second input shaft IS2, the first input shaft IS1, the second gear set GT2, and the first output shaft OS1.

The torque received through the first output shaft OS1 is delivered to the differential through the first output gear OG1, realizing the eCVT1 mode.

[eCVT2 Mode]

In the eCVT2 mode, the engine ENG is operated at a fixed rotation speed. In the instant state, as shown in FIG. 2, the third sleeve SLE3 of the third synchronizer SL3 is operated to synchronously connect the second shifting gear SG2 to the first output shaft OS1, and the engine clutch EC is operated.

In the instant case, the torque of the engine ENG rotating at a fixed rotation speed is input to the fourth rotation element N4 of the compound planetary gear set CPG, and the torque of the motor-generator MG is input to the third rotation element N3 of the compound planetary gear set CPG.

In such a state, when the rotation speed of the motor-generator MG is varied, the torque of the motor-generator MG is input to the second rotation element N2 of the compound planetary gear set CPG, and by the operation of the third synchronizer SL3, transmitted through the second input shaft IS2, the fourth gear set GT4, and the first output shaft OS1.

The torque received through the first output shaft OS1 is delivered to the differential through the first output gear OG1, realizing the eCVT2 mode.

[eCVT3 Mode]

In the eCVT3 mode, the engine ENG is operated at a fixed rotation speed. In the instant state, as shown in FIG. 2, the first sleeve SLE1 of the first synchronizer SL1 is operated to synchronously connect the third shifting gear SG3 to the first output shaft OS1, the second sleeve SLE2 of the second synchronizer SL2 is operated to synchronously connect the first and second input shafts IS1 and IS2, and the engine clutch EC is operated.

In the instant case, the torque of the engine ENG rotating at a fixed rotation speed is input to the fourth rotation element N4 of the compound planetary gear set CPG, and the torque of the motor-generator MG is input to the third rotation element N3 of the compound planetary gear set CPG.

In such a state, when the rotation speed of the motor-generator MG is varied, the torque of the motor-generator MG is input to the second rotation element N2 of the compound planetary gear set CPG, and by the operation of the first and second synchronizers SL1 and SL2, transmitted through the second input shaft IS2, the first input shaft IS1, the first gear set GT1, and the first output shaft OS1.

The torque received through the first output shaft OS1 is delivered to the differential through the first output gear OG1, realizing the eCVT3 mode.

Figure 3:
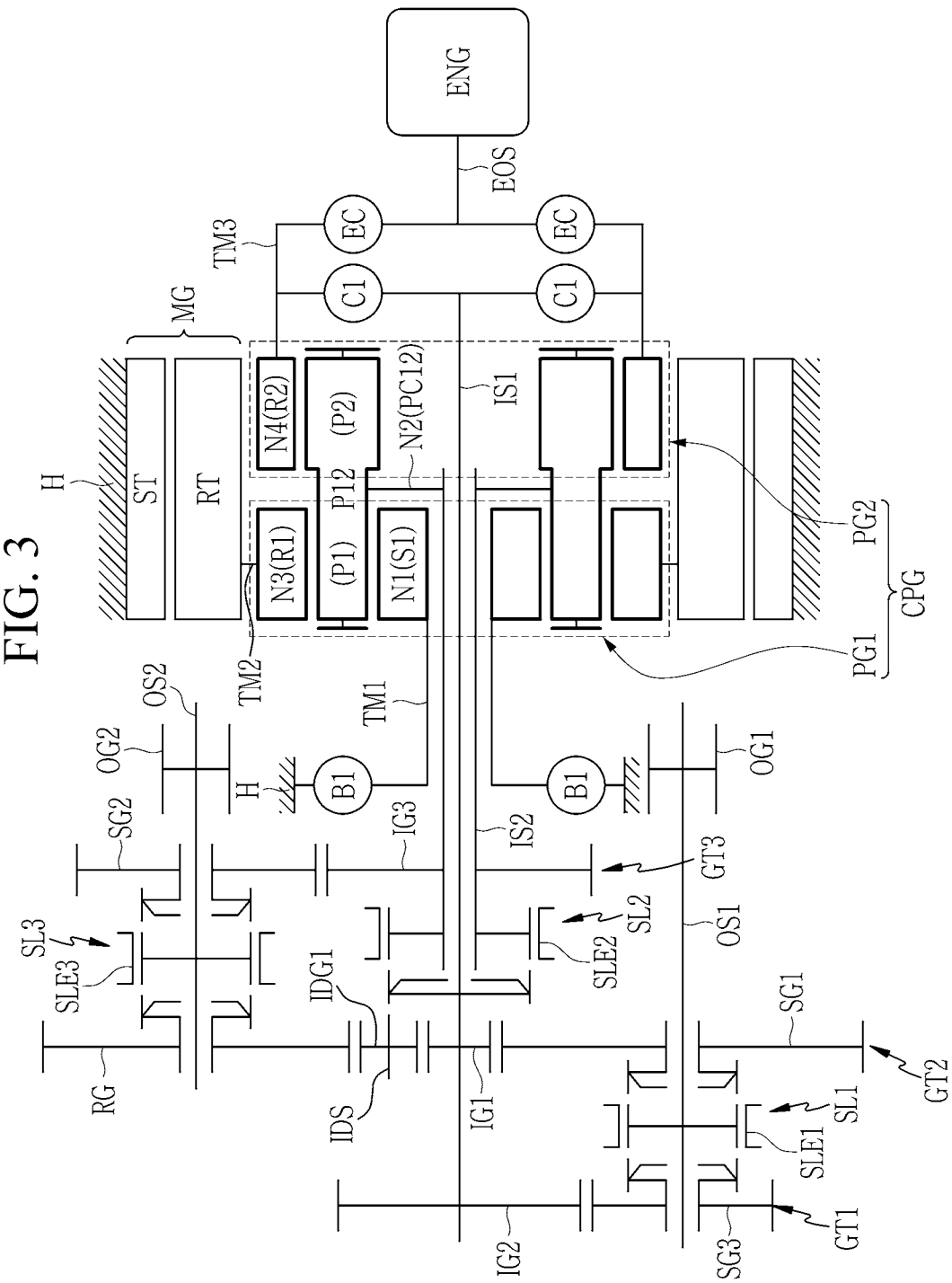
FIG. 3 is a schematic diagram of a power transmission apparatus of a hybrid electric vehicle according to various exemplary embodiments of the present invention.

FIG. 3 is a schematic diagram of a power transmission apparatus of a hybrid electric vehicle according to various exemplary embodiments of the present invention.

Referring to FIG. 3, a power transmission apparatus according to various exemplary embodiments differs from the various exemplary embodiments of FIG. 1 in that a second output shaft OS2 is further employed in addition to the first output shaft OS1.

The first output shaft OS1 is mounted in parallel with the first input shaft IS1, receives a torque received from the first input shaft IS1, and outputs a torque through the first output gear OG1. The second output shaft OS2 is mounted in parallel with the first input shaft IS1 and the first output shaft OS1, receives torques from the second input shaft IS2 and the idle shaft IDS, and outputs a torque through the second output gear OG2.

According to the various exemplary embodiments of FIG. 3 further employing the second output shaft OS2, the first gear set GT1 is the same as in the various exemplary embodiments of the present invention in FIG. 1, the fourth gear set GT4 of the various exemplary embodiments in FIG. 1 may be renamed as the third gear set GT3 of the various exemplary embodiments of the present invention in FIG. 3, and the third gear set GT3 of the various exemplary embodiments of FIG. 1 is merged into the second gear set GT2 of the various exemplary embodiments of FIG. 3.

That is, the second gear set GT2 according to various exemplary embodiments of FIG. 3 includes a first input gear IG1 fixedly mounted on the first input shaft IS1, a first idle gear IDG1 fixedly mounted on the idle shaft IDS and externally gear-meshed with the first input gear IG1, a first shifting gear SG1 mounted on the first output shaft OS1 without rotational interference therebetween, externally gear-meshed with the first input gear IG1, and selectively connectable to the first output shaft OS1, and a reverse shifting gear RG mounted on the second output shaft OS2 without rotational interference therebetween, externally gear-meshed with the first idle gear IDG1, and selectively connectable to the second output shaft OG2.

Furthermore, the third gear set GT3 includes a third input gear IG3 fixedly mounted on the second input shaft IS2, and a second shifting gear SG2 mounted on the first output shaft OS1 without rotational interference therebetween, externally gear-meshed with the third input gear IG3, and selectively connectable to the first output shaft OS1.

As a result, the third synchronizer SL3 selectively connects the second shifting gear SG2 and the reverse shifting gear RG to the second output shaft OS2, respectively.

Such a power transmission apparatus of a hybrid electric vehicle according to various exemplary embodiments of FIG. 3 merely differs from the various exemplary embodiments of FIG. 1 in that the second output shaft OS2 is further employed, and thereby the arrangement of the second gear set GT2, the third gear set GT3, and the third synchronizer SL3 is slightly altered. However, other features including structural features and shifting operations remain the same as in the various exemplary embodiments of the present invention in FIG. 1, and therefore are not further described in detail.

Figure 4:
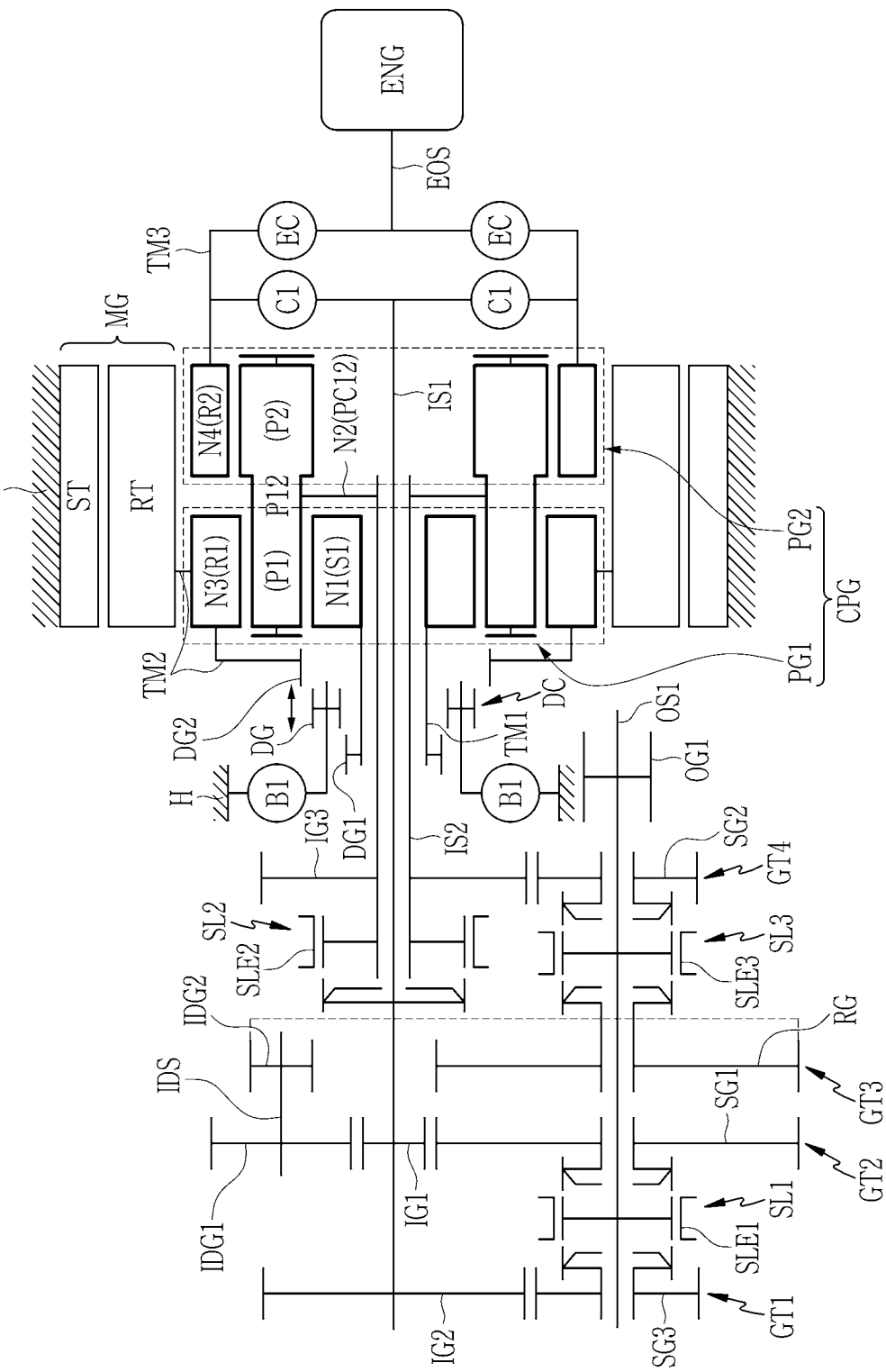
FIG. 4 is a schematic diagram of a power transmission apparatus of a hybrid electric vehicle according to various exemplary embodiments of the present invention.

FIG. 4 is a schematic diagram of a power transmission apparatus of a hybrid electric vehicle according to various exemplary embodiments of the present invention.

Referring to FIG. 4, a power transmission apparatus according to various exemplary embodiments differs from the various exemplary embodiments of FIG. 1 in the arrangement of the engagement element.

That is, the engagement element of the various exemplary embodiments in FIG. 1 includes only the first brake B1 which is mounted between the transmission housing H and the first connecting member TM1 connected to the first rotation element N1 (first sun gear S1) of the compound planetary gear set CPG, such that the first rotation element N1 may selectively act as a fixed element.

However, according to the various exemplary embodiments of the present invention in FIG. 3, a bi-directional dog clutch DC is further employed as an engagement element in addition to the first brake B1.

In more detail, the first brake B1 is formed at the transmission housing H, and the bi-directional dog clutch DC is mounted between the first brake B1 and the first and third rotation elements N1 and N3 of the compound planetary gear set CPG, to selectively connect the first brake B1 to the first and third rotation elements N1 and N3.

A first gear DG1 of the bi-directional dog clutch DC is connected to the first rotation element N1 of the compound planetary gear set CPG through the first connecting member TM1. A second gear DG2 of the bi-directional dog clutch DC is connected to the third rotation element N3 of the compound planetary gear set CPG through the second connecting member TM2.

Furthermore, a clutch gear DG is mounted between the first and second gears DG1 and DG2. The clutch gear DG is connected to the first brake B1 and selectively teeth-engaged with one of the first and second gears DG1 and DG2, to selectively connect the first brake B1 to the first rotation element N1 or to the third rotation element N3.

Therefore, when the first brake B1 is operated, the first rotation element N1 or the third rotation element N3 may selectively act as a fixed element.

That is, a power transmission apparatus of a hybrid electric vehicle according to various exemplary embodiments in FIG. 3 merely differs from the various exemplary embodiments in FIG. 1 in that the bi-directional dog clutch DC is further employed in addition to the first brake B1, and other features remain the same.

FIG. 5 is an operation chart of a power transmission apparatus of a hybrid electric vehicle according to various exemplary embodiments of FIG. 4.

Referring to FIG. 5, a power transmission apparatus according to various exemplary embodiments differs from the various exemplary embodiments in the operational chart of FIG. 1, in that the seventh forward, eighth, and ninth speeds are further realized in an engine mode.

In the first forward, third, and fourth speeds of the engine mode, the parallel hybrid mode, the electric vehicle mode (EV mode), the first brake B1 is operated, and therefore the clutch gear DG of the bi-directional dog clutch DC is operated to be engaged with the first gear DG1, to connect the first brake B1 to the first rotation element N1 of the compound planetary gear set CPG, such that the first rotation element N1 of the compound planetary gear set CPG may act as a fixed element. It may be understood from the operation chart that all shifting stages of the various exemplary embodiments may be realized in the various exemplary embodiments in the same way.

Hereinafter, engine mode seventh forward, eighth, and ninth speeds that are available only in the engine mode are described in detail.

[Engine Mode Seventh Forward Speed]

In an engine mode seventh forward speed FD7, as shown in FIG. 5, the first sleeve SLE1 of the first synchronizer SL1 is operated to synchronously connect the first shifting gear SG1 to the first output shaft OS1, the second sleeve SLE2 of the second synchronizer SL2 is operated to synchronously connect the first and second input shafts IS1 and IS2, the clutch gear DG of the bi-directional dog clutch DC is engaged with the second gear DG2, and the engine clutch EC and the first brake B1 are operated.

As a result, by the operation of the first brake B1, the bi-directional dog clutch DC, and the first and second synchronizers SL1 and SL2, the third rotation element N3 of the compound planetary gear set CPG acts as a fixed element. Furthermore, by the operation of the engine clutch EC, the torque of the engine ENG is input from the engine output shaft EOS to the fourth rotation element N4 of the compound planetary gear set CPG and is transmitted through the second rotation element N2, the second input shaft IS2, the first input shaft IS1, the second gear set GT2, and the first output shaft OS1.

The torque received through the first output shaft OS1 is delivered to the differential through the first output gear OG1, realizing the seventh forward speed.

[Engine Mode Eighth Forward Speed]

In an engine mode eighth forward speed FD8, as shown in FIG. 5, the third sleeve SLE3 of the third synchronizer SL3 is operated to synchronously connect the second shifting gear SG2 to the first output shaft OS1, the clutch gear DG of the bi-directional dog clutch DC is engaged with the second gear DG2, and the engine clutch EC and the first brake B1 are operated.

As a result, by the operation of the first brake B1, the bi-directional dog clutch DC, and the third synchronizer SL3, the third rotation element N3 of the compound planetary gear set CPG acts as a fixed element. Furthermore, by the operation of the engine clutch EC, the torque of the engine ENG is input from the engine output shaft EOS to the fourth rotation element N4 of the compound planetary gear set CPG, and is transmitted through the second rotation element N2, the second input shaft IS2, the fourth gear set GT4, and the first output shaft OS1.

The torque received through the first output shaft OS1 is delivered to the differential through the first output gear OG1, realizing the eighth forward speed.

[Engine Mode Ninth Forward Speed]

In an engine mode ninth forward speed FD9, as shown in FIG. 5, the first sleeve SLE1 of the first synchronizer SL1 is operated to synchronously connect the third shifting gear SG3 to the first output shaft OS1, the second sleeve SLE2 of the second synchronizer SL2 is operated to synchronously connect the first and second input shafts IS1 and IS2, clutch gear DG of the bi-directional dog clutch DC is engaged with the second gear DG2, and the engine clutch EC and the first brake B1 are operated.

As a result, by the operation of the first brake B1, the bi-directional dog clutch DC, and the first and second synchronizers SL1 and SL2, the third rotation element N3 of the compound planetary gear set CPG acts as a fixed element. Furthermore, by the operation of the engine clutch EC, the torque of the engine ENG is input from the engine output shaft EOS to the fourth rotation element N4 of the compound planetary gear set CPG, and is transmitted through the second rotation element N2, the second input shaft IS2, the first input shaft IS1, the first gear set GT1, and the first output shaft OS1.

The torque transmitted to the first output shaft OS1 is delivered to the differential through the first output gear OG1, realizing the ninth forward speed.

Figure 6:
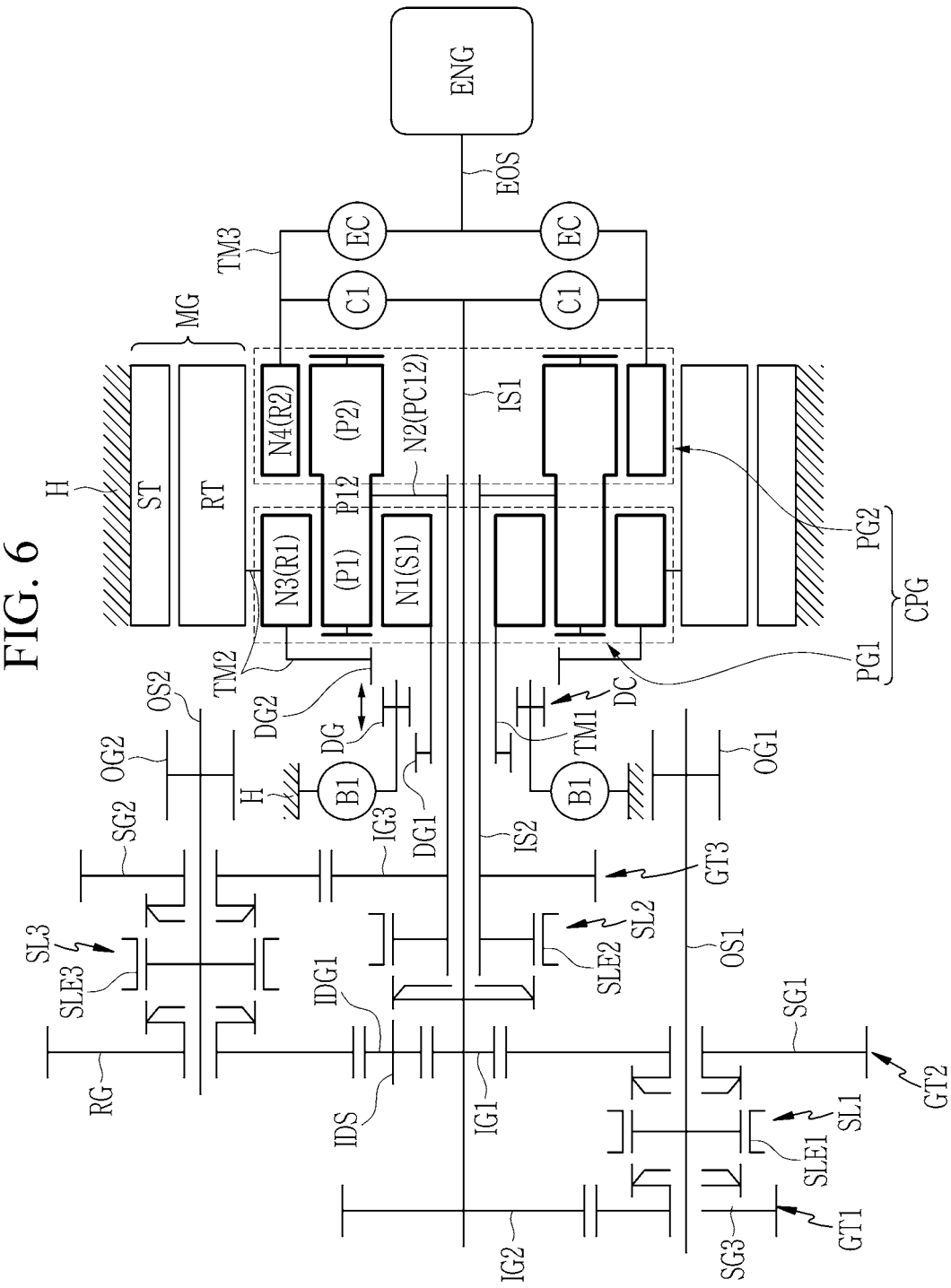
FIG. 6 is a schematic diagram of a power transmission apparatus of a hybrid electric vehicle according to various exemplary embodiments of the present invention.

FIG. 6 is a schematic diagram of a power transmission apparatus of a hybrid electric vehicle according to various exemplary embodiments of the present invention.

Referring to FIG. 6, a power transmission apparatus according to various exemplary embodiments of FIG. 6 differs from the various exemplary embodiments of FIG. 4 in that a second output shaft OS2 is further included in addition to the first output shaft OS1.

The first output shaft OS1 is mounted in parallel with the first input shaft IS1, receives a torque received from the first input shaft IS1, and outputs a torque through the first output gear OG1. The second output shaft OS2 is mounted in parallel with the first input shaft IS1 and the first output shaft OS1, receives torques from the second input shaft IS2 and the idle shaft IDS, and outputs a torque through the second output gear OG2.

According to the various exemplary embodiments further employing the second output shaft OS2 in FIG. 6, the first gear set GT1 is the same as in the various exemplary embodiments of the present invention in FIG. 1, the fourth gear set GT4 of the various exemplary embodiments may be renamed as the third gear set GT3 of the various exemplary embodiments of the present invention in FIG., and the third gear set GT3 of the various exemplary embodiments is merged into the second gear set GT2 of the various exemplary embodiments in FIG.

That is, the second gear set GT2 according to various exemplary embodiments includes a first input gear IG1 fixedly mounted on the first input shaft IS1, a first idle gear IDG1 fixedly mounted on the idle shaft IDS and externally gear-meshed with the first input gear IG1, a first shifting gear SG1 mounted on the first output shaft OS1 without rotational interference therebetween, externally gear-meshed with the first input gear IG1, and selectively connectable to the first output shaft OS1, and a reverse shifting gear RG mounted on the second output shaft OS2 without rotational interference therebetween, externally gear-meshed with the first idle gear IDG1, and selectively connectable to the second output shaft OG2.

Furthermore, the third gear set GT3 includes a third input gear IG3 fixedly mounted on the second input shaft IS2, and a second shifting gear SG2 mounted on the first output shaft OS1 without rotational interference therebetween, externally gear-meshed with the third input gear IG3, and selectively connectable to the first output shaft OS1.

As a result, the third synchronizer SL3 selectively connects the second shifting gear SG2 and the reverse shifting gear RG to the second output shaft OS2, respectively.

Such a power transmission apparatus of a hybrid electric vehicle according to various exemplary embodiments in FIG. 6 merely differs from the various exemplary embodiments in FIG. 4 in that the second output shaft OS2 is further employed, and thereby the arrangement of the second gear set GT2, the third gear set GT3, and the third synchronizer SL3 is slightly altered. However, other features including structural features and shifting operations remain the same as in the various exemplary embodiments of the present invention in FIG. 4, and therefore are not further described in detail.

As described above, a power transmission apparatus of a hybrid electric vehicle according to exemplary embodiments employs only one compound planetary gear set CPG, simplifying the structure of a transmission. Furthermore, various shifting modes, such as an engine mode having ten shifting stages, seven a parallel hybrid mode having seven shifting stages, an electronically-controlled continuously variable shifting mode (eCVT mode) having three shifting stages, and an electric vehicle mode (EV mode) having six shifting stages, may be realized, reducing a production cost, and realizing fuel consumption characteristic and power performance above an equivalent transmission.

The engine mode (or the parallel hybrid mode) and the eCVT mode may be combined, and therefore, shifting modes of at least thirteen speeds may be realized. Accordingly, fuel consumption may be improved by use of the eCVT mode when driving in a city-mode.

Furthermore, the number of employed planetary gear sets may be decreased in comparison to a conventional six-speed transmission, and therefore, an overall length may be decreased, improving installability.

Furthermore, by controlling the first brake B1 through the bi-directional dog clutch DC, when the first brake B1 is released, a drag loss of the first brake B1 may be minimized by utilizing a neutral state of the bi-directional dog clutch DC.

While the present invention has been described in connection with what is presently considered to be practical exemplary embodiments of the present invention, it is to be understood that the present invention is not limited to the included exemplary embodiments. On the other hand, it is directed to cover various modifications and equivalent claims as well as various alternatives and modifications thereof. It is intended that the scope of the present invention be defined by the Claims appended hereto and their equivalents."

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power transmission apparatus for a hybrid electric vehicle having power sources of an engine and a motor-generator, the power transmission apparatus comprising:
    a first input shaft mounted along an axis of an engine output shaft and selectively connectable to the engine output shaft;
    a second input shaft formed as a hollow shaft, coaxially mounted with the first input shaft without rotational interference with the first input shaft, and selectively connectable to the first input shaft;
    a compound planetary gear set mounted along an axis of the second input shaft and formed as a combination of first and second planetary gear sets sharing a single sun gear and a planet carrier between the first and second planetary gear sets to form a first rotation element, a second rotation element, a third rotation element, and a fourth rotation element, the first rotation element being selectively connectable to a transmission housing, the second rotation element being fixedly connected to the second input shaft, the third rotation element being fixedly connected to a rotor of the motor-generator, and the fourth rotation element being selectively connected to the engine output shaft;
    an idle shaft mounted in parallel with the first input shaft;
    a first output shaft mounted in parallel to the first input shaft, receiving a torque from at least the first input shaft, and outputting a torque through a first output gear fixed to the first output shaft;
    at least one connection element selectively transmitting a torque received from the engine output shaft to a rotation element among the first rotation element, the second rotation element, the third rotation element, and the fourth rotation element of the compound planetary gear set or the first input shaft;
    at least one engagement element selectively connecting at least one rotation element among the first rotation element, the second rotation element, the third rotation element, and the fourth rotation element of the compound planetary gear set to the transmission housing; and
    a plurality of gear sets mounted on the first and second input shafts, the idle shaft and the first output shaft to form a predetermined gear engagement,
    wherein the first planetary gear set is formed as a single pinion planetary gear set, and includes a first sun gear as the first rotation element, a common planet carrier as the second rotation element for rotatably supporting a shared planetary gear, and a first ring gear as the third rotation element, and
    wherein the second planetary gear set is formed as a single planetary gear set, shares the first sun gear and the common planet carrier with the first planetary gear set, and includes a second ring gear as the fourth rotation element.

2. The power transmission apparatus of claim 1, wherein the shared planetary gear includes a first diameter portion mounted toward the first planetary gear set and a second diameter portion mounted toward the second planetary gear set, wherein a diameter of the second diameter portion is larger than a diameter of the first diameter portion.

3. The power transmission apparatus of claim 1, wherein the at least one connection element includes:
    an engine clutch selectively connecting the engine output shaft and the fourth rotation element; and
    a first clutch selectively connecting the fourth rotation element and the first input shaft.

4. The power transmission apparatus of claim 3, wherein the at least one engagement element includes a first brake mounted between the transmission housing and the first rotation element of the compound planetary gear set.

5. The power transmission apparatus of claim 4, wherein the plurality of gear sets comprise:
    a first gear set including a second input gear fixedly mounted on the first input shaft, and a third shifting gear rotatably mounted on the first output shaft, gear-engaged with the second input gear, and selectively connectable to the first output shaft;
    a second gear set including a first input gear fixedly mounted on the first input shaft, a first idle gear fixedly mounted on the idle shaft and gear-engaged with the first input gear, and a first shifting gear rotatably mounted on the first output shaft, gear-engaged with the first input gear, and selectively connectable to the first output shaft;
    a third gear set including a second idle gear fixedly mounted on the idle shaft, and a reverse shifting gear rotatably mounted on the first output shaft, gear-engaged with the second idle gear, and selectively connectable to the first output shaft; and
    a fourth gear set including a third input gear fixedly mounted on the second input shaft, and a second shifting gear rotatably mounted on the first output shaft, gear-engaged with the third input gear, and selectively connectable to the first output shaft.

6. The power transmission apparatus of claim 5,
wherein one of the first and third shifting gears is selectively connectable to the first output shaft by a first synchronizer,
wherein the second input shaft is selectively connectable to the first input shaft by a second synchronizer, and
wherein one of the second shifting gear and the reverse shifting gear is selectively connectable to the first output shaft by a third synchronizer.

7. The power transmission apparatus of claim 4, further including:
a second output shaft mounted in parallel to the first input shaft, receiving torques from the second input shaft and the idle shaft, and outputting a torque through the second output gear.

8. The power transmission apparatus of claim 7, wherein the plurality of gear sets comprise:
a first gear set including a second input gear fixedly mounted on the first input shaft, and a third shifting gear rotatably mounted on the first output shaft, gear-engaged with the second input gear, and selectively connectable to the first output shaft;
a second gear set including a first input gear fixedly mounted on the first input shaft, a first idle gear fixedly mounted on the idle shaft and gear-engaged with the first input gear, a first shifting gear rotatably mounted on the first output shaft, gear-engaged with the first input gear, and selectively connectable to the first output shaft, and a reverse shifting gear rotatably mounted on the second output shaft, gear-engaged with the first idle gear, and selectively connectable to the second output shaft;
a third gear set including a third input gear fixedly mounted on the second input shaft, and a second shifting gear rotatably mounted on the second output shaft, gear-engaged with the third input gear, and selectively connectable to the second output shaft.

9. The power transmission apparatus of claim 8,
wherein one of the first and third shifting gears is selectively connectable to the first output shaft by a first synchronizer,
wherein the second input shaft is selectively connectable to the first input shaft by a second synchronizer, and
wherein one of the second shifting gear and the reverse shifting gear is selectively connectable to the second output shaft by a third synchronizer.

10. The power transmission apparatus of claim 3, wherein the at least one engagement element includes:
a first brake formed at the transmission housing; and
a bi-directional dog clutch mounted between the first brake and the first and third rotation elements of the compound planetary gear set to selectively connect the first brake to one of the first and third rotation elements.

11. The power transmission apparatus of claim 10, wherein the bi-directional dog clutch includes:
a first gear connected to the first rotation element of the compound planetary gear set through a first connecting member;
a second gear connected to the third rotation element of the compound planetary gear set through a second connecting member; and
a clutch gear connected to the first brake and selectively teeth-engaged with one of the first and second gears to selectively connect the first brake to the first rotation element or the third rotation element.

12. The power transmission apparatus of claim 10, wherein the plurality of gear sets includes:
a first gear set including a second input gear fixedly mounted on the first input shaft, and a third shifting gear rotatably mounted on the first output shaft, gear-engaged with the second input gear, and selectively connectable to the first output shaft;
a second gear set including a first input gear fixedly mounted on the first input shaft, a first idle gear fixedly mounted on the idle shaft and gear-engaged with the first input gear, and a first shifting gear rotatably mounted on the first output shaft, gear-engaged with the first input gear, and selectively connectable to the first output shaft;
a third gear set including a second idle gear fixedly mounted on the idle shaft, and a reverse shifting gear rotatably mounted on the first output shaft, gear-engaged with the second idle gear, and selectively connectable to the first output shaft; and
a fourth gear set including a third input gear fixedly mounted on the second input shaft, and a second shifting gear rotatably mounted on the first output shaft, gear-engaged with the third input gear, and selectively connectable to the first output shaft.

13. The power transmission apparatus of claim 12,
wherein one of the first and third shifting gears is selectively connectable to the first output shaft by a first synchronizer,
wherein the second input shaft is selectively connectable to the first input shaft by a second synchronizer, and
wherein one of the second shifting gear and the reverse shifting gear is selectively connectable to the first output shaft by a third synchronizer.

14. The power transmission apparatus of claim 10, further including:
a second output shaft mounted in parallel to the first input shaft, receiving torques from the second input shaft and the idle shaft, and outputting a torque through the second output gear.

15. The power transmission apparatus of claim 14, wherein the plurality of gear sets comprise:
a first gear set including a second input gear fixedly mounted on the first input shaft, and a third shifting gear rotatably mounted on the first output shaft, gear-engaged with the second input gear, and selectively connectable to the first output shaft;
a second gear set including a first input gear fixedly mounted on the first input shaft, a first idle gear fixedly mounted on the idle shaft and gear-engaged with the first input gear, a first shifting gear rotatably mounted on the first output shaft, gear-engaged with the first input gear, and selectively connectable to the first output shaft, and a reverse shifting gear rotatably mounted on the second output shaft, gear-engaged with the first idle gear, and selectively connectable to the second output shaft; and
a third gear set including a third input gear fixedly mounted on the second input shaft, and a second shifting gear rotatably mounted on the second output shaft, gear-engaged with the third input gear, and selectively connectable to the second output shaft.

16. The power transmission apparatus of claim 15,
wherein one of the first and third shifting gears is selectively connectable to the first output shaft by a first synchronizer;
wherein the second input shaft is selectively connectable to the first input shaft by a second synchronizer; and wherein one of the second shifting gear and the reverse shifting gear is selectively connectable to the second output shaft by a third synchronizer.

* * * * *